US008526334B2

(12) United States Patent
Constantinescu

(10) Patent No.: US 8,526,334 B2
(45) Date of Patent: Sep. 3, 2013

(54) CHOOSING CONNECTABLE END POINTS FOR NETWORK TEST

(75) Inventor: Mihail Florin Constantinescu, Bucharest (RO)

(73) Assignee: Ixia, Calabasas, CA (US)

( * ) Notice: Subject to any disclaimer, the term of this patent is extended or adjusted under 35 U.S.C. 154(b) by 103 days.

(21) Appl. No.: 13/315,896

(22) Filed: Dec. 9, 2011

(65) Prior Publication Data

US 2013/0148516 A1    Jun. 13, 2013

(51) Int. Cl.
*H04L 12/28* (2006.01)
(52) U.S. Cl.
USPC ............................ 370/255; 370/250; 370/254
(58) Field of Classification Search
USPC .......................................... 370/250, 254, 255
See application file for complete search history.

(56) References Cited

U.S. PATENT DOCUMENTS

| 6,205,122 B1* | 3/2001 | Sharon et al. ................ 370/254 |
| 7,586,891 B1* | 9/2009 | Masciulli ...................... 370/344 |
| 2005/0022189 A1* | 1/2005 | Proulx et al. .................. 718/100 |
| 2010/0097943 A1* | 4/2010 | D'Souza et al. ............... 370/248 |
| 2010/0110921 A1* | 5/2010 | Famolari et al. .............. 370/252 |
| 2011/0075567 A1* | 3/2011 | Xu et al. ....................... 370/242 |
| 2013/0080618 A1* | 3/2013 | Balwani ........................ 709/224 |

\* cited by examiner

*Primary Examiner* — Jason Mattis
(74) *Attorney, Agent, or Firm* — SoCal IP Law Group LLP; John E. Gunther; Steven C. Sereboff

(57) ABSTRACT

Methods and apparatus for conducting a test of a network including a plurality of endpoints, each endpoint including a software agent for conducting network tests. Candidate endpoints pairs to conduct the test may be identified from the plurality of endpoints. The candidate endpoints pairs may be ranked in accordance with stored connectivity data. The connectivity of the candidate endpoint pairs may be checked in rank order until a connectable endpoint pair is located. The connectable endpoint pair may be instructed to conduct the test.

13 Claims, 5 Drawing Sheets

CHOOSING CONNECTABLE END POINTS FOR NETWORK TEST

NOTICE OF COPYRIGHTS AND TRADE DRESS

A portion of the disclosure of this patent document contains material which is subject to copyright protection. This patent document may show and/or describe matter which is or may become trade dress of the owner. The copyright and trade dress owner has no objection to the facsimile reproduction by anyone of the patent disclosure as it appears in the Patent and Trademark Office patent files or records, but otherwise reserves all copyright and trade dress rights whatsoever.

BACKGROUND

1. Field

This disclosure relates to performance testing of a communications network.

2. Description of the Related Art

In many types of communications networks, each message to be sent is divided into portions of fixed or variable length. Each portion may be referred to as a packet, a frame, a cell, a datagram, a data unit, or other unit of information, all of which are referred to herein as packets.

Each packet contains a portion of an original message, commonly called the payload of the packet. The payload of a packet may contain data, or may contain voice or video information. The payload of a packet may also contain network management and control information. In addition, each packet contains identification and routing information, commonly called a packet header. The packets are sent individually over the network through multiple switches or nodes. The packets are reassembled into the message at a final destination using the information contained in the packet headers, before the message is delivered to a target device or end user. At the receiving end, the reassembled message is passed to the end user in a format compatible with the user's equipment.

Communications networks that transmit messages as packets are called packet switched networks. Packet switched networks commonly contain a mesh of transmission paths which intersect at hubs or nodes. At least some of the nodes may include a switching device or router that receives packets arriving at the node and retransmits the packets along appropriate outgoing paths.

In order to test a packet switched network or a device included in a packet switched communications network, test traffic comprising a large number of packets may be generated and transmitted through the network. In some cases, the objective of a network test may be to determine the performance of the network between two specific devices connected to the network or between two specific regions within the network.

Throughout this description, elements appearing in figures are assigned three-digit reference designators, where the most significant digit is the figure number where the element is introduced and the two least significant digits are specific to the element. An element that is not described in conjunction with a figure may be presumed to have the same characteristics and function as a previously-described element having the same reference designator.

DETAILED DESCRIPTION

Description of Apparatus

Figure 1:
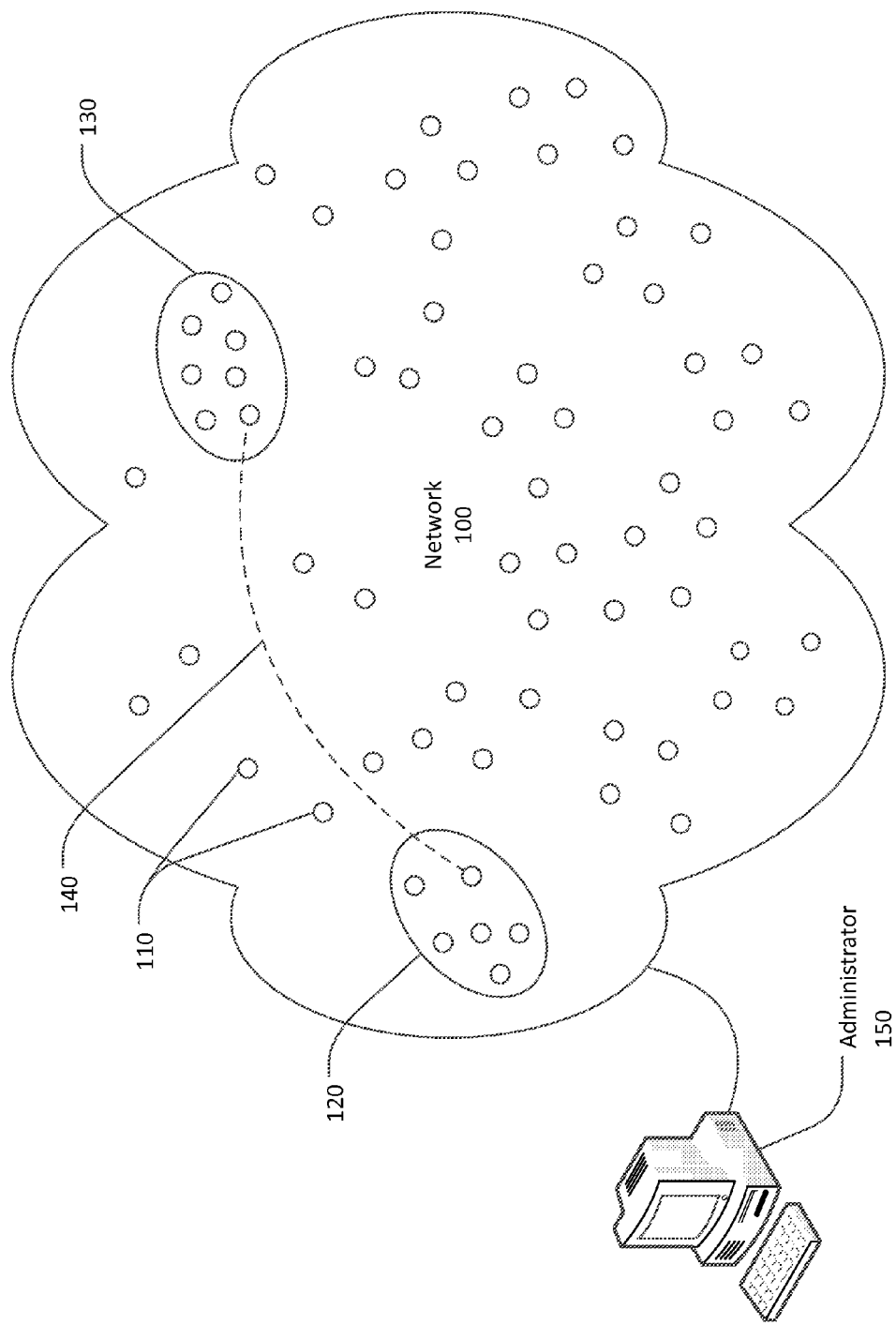
FIG. 1 is a block diagram of a network environment.

FIG. 1 shows a block diagram of a network environment. The environment may include a network 100 and a test administrator computing device 150. The network 100 may be a Local Area Network (LAN), a Wide Area Network (WAN), a Storage Area Network (SAN), wired, wireless, or a combination of these, and may include or be the Internet. The network 100 may consist of a plurality of network devices interconnected by a plurality of communications paths.

In this application, the term "network device" encompasses any device capable of communicating over the network 100. The network devices within the network 100 may be computing devices such as workstations, personal computers, servers, portable computers, computing tablets, cellular/mobile telephones, e-mail appliances, and the like; peripheral devices such as printers, scanners, facsimile machines and the like; network capable storage devices including disk drives such as network attached storage (NAS) and storage area network (SAN) devices; networking devices such as routers, relays, hubs, switches, bridges, server load balancers (SLBs), and multiplexers. In addition, the one or more network devices may include appliances, alarm systems, and any other device or system capable of communicating over a network.

Communications on the network 100 may take various forms, including frames, cells, datagrams, packets or other units of information, all of which are referred to herein as packets. The network devices within the network 100 may communicate simultaneously with one another, and there may be plural logical communications paths between the any given pair of network devices.

At least some of the devices within the network 100 may include preinstalled software agents that allow each device to serve as an endpoint 110 for network testing. These endpoints 110 may be, for example, user or client computers connected at the periphery of the network 100 or switches, routers, servers, and other devices within the fabric of the network. Pairs of endpoints may execute test protocols by exchanging communications traffic and measuring performance of the network. Different pairs of endpoints may execute different test protocols to perform an overall test of all or portions of the network. Each test protocol may be executed by an application level program using an existing operating system, protocol stack, and hardware of the network device that hosts the endpoint software agent.

The test administrator computing device 150 may communicate with some or all of the endpoints 110 via the network 100. In order to conduct a network test, the test administrator computing device 150 may select a pair of connectable endpoints, provide a test protocol to the selected endpoints, and initiate execution of the test protocol. The test administrator computing device 150 may also receive measured results of the test from the selected endpoints for analysis and display. Measured results may include, for example, performance characteristics such as throughput, transaction rate and response time for the test scenario.

A user may instruct the test administrator computing device 150 to conduct a test between a first region 120 of the network 100 and a second region 130 of the network 100, each of which includes a plurality of endpoints. The first and second regions 120, 130 may be, for example, logically separate sub-nets or local area networks and/or physically separate location such as different cities, different builds, or different floors of a common building. In some cases, such as conducting a test within a local area network, the first and second regions 120, 130 may be coextensive. To conduct such a test, the test administrator computing device 150 may select a first endpoint within the first region 120 of the network 100 and a second endpoint within the second region 130 of the network 100.

Figure 2:
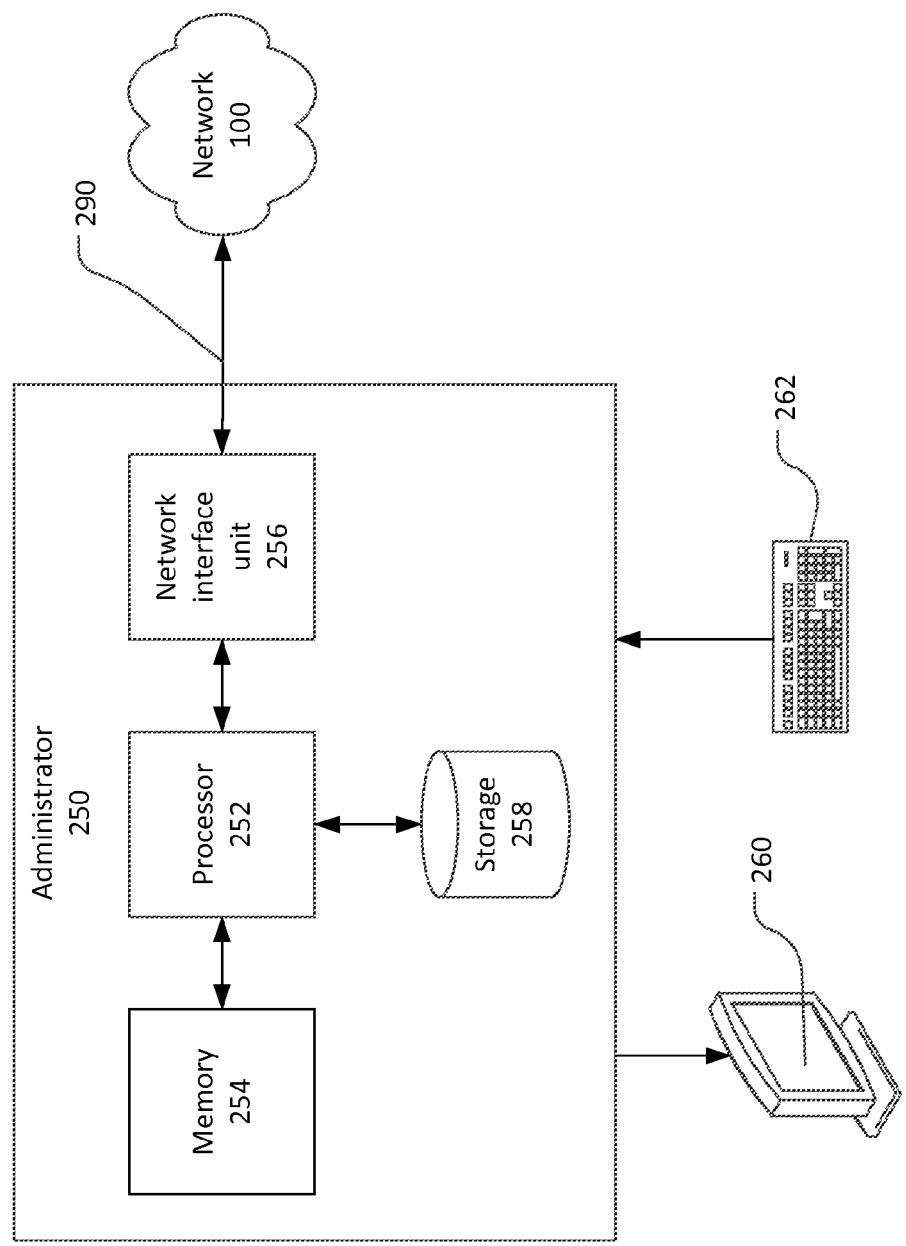
FIG. 2 is a block diagram of a computing device.

Referring now to FIG. 2, a test administrator computing device 250, which may be the test administrator computing device 150, may include at least one processor 252 coupled to a memory 254 and a storage device 258. The test administrator computing device 250 may include or be coupled to a display 260 and one or more user input devices such as a keyboard 262 and a mouse or other pointing device (not shown).

The processor 252 may be a single processor, multiple processors, or multiple processor cores within one or more processor circuit devices. The processor 252 may be communicatively coupled to the network 100 via a network interface unit 256.

The network interface unit 256 may convert outgoing messages from the processor 252 into the electrical, optical, or wireless signal format required to transmit the outgoing messages to the network 100 via a communications link 290. The communications link 290 may be a wire, an optical fiber, a wireless link, or other communication link. Similarly, the network interface unit 256 may receive electrical, optical, or wireless signals from the network 100 over the communications link 290 and may convert the received signals into incoming messages in a format usable to the processor 252.

The processor 252 may execute software instructions to cause the test administrator computing device 250 to perform the actions and methods described herein. The software instructions may be stored on a machine readable storage medium within the storage device 258. Machine readable storage media include, for example, magnetic media such as hard disks, floppy disks and tape; optical media such as compact disks (CD-ROM and CD-RW) and digital versatile disks (DVD and DVD±RW); flash memory cards; and other storage media. Within this patent, the term "storage medium" refers to a physical object capable of storing data. The term "storage medium" does not encompass transitory media, such as propagating signals or waveforms.

The memory 254 may be static and/or dynamic random access memory or a combination of random access memory and other memory such as nonvolatile writable memory and read only memory. All or portions of the software instructions may be copied from the storage device 258 to a portion of the memory 254 for execution. The memory 254 may also store data for use during the execution of those software instructions.

Description of Processes

Figure 3:
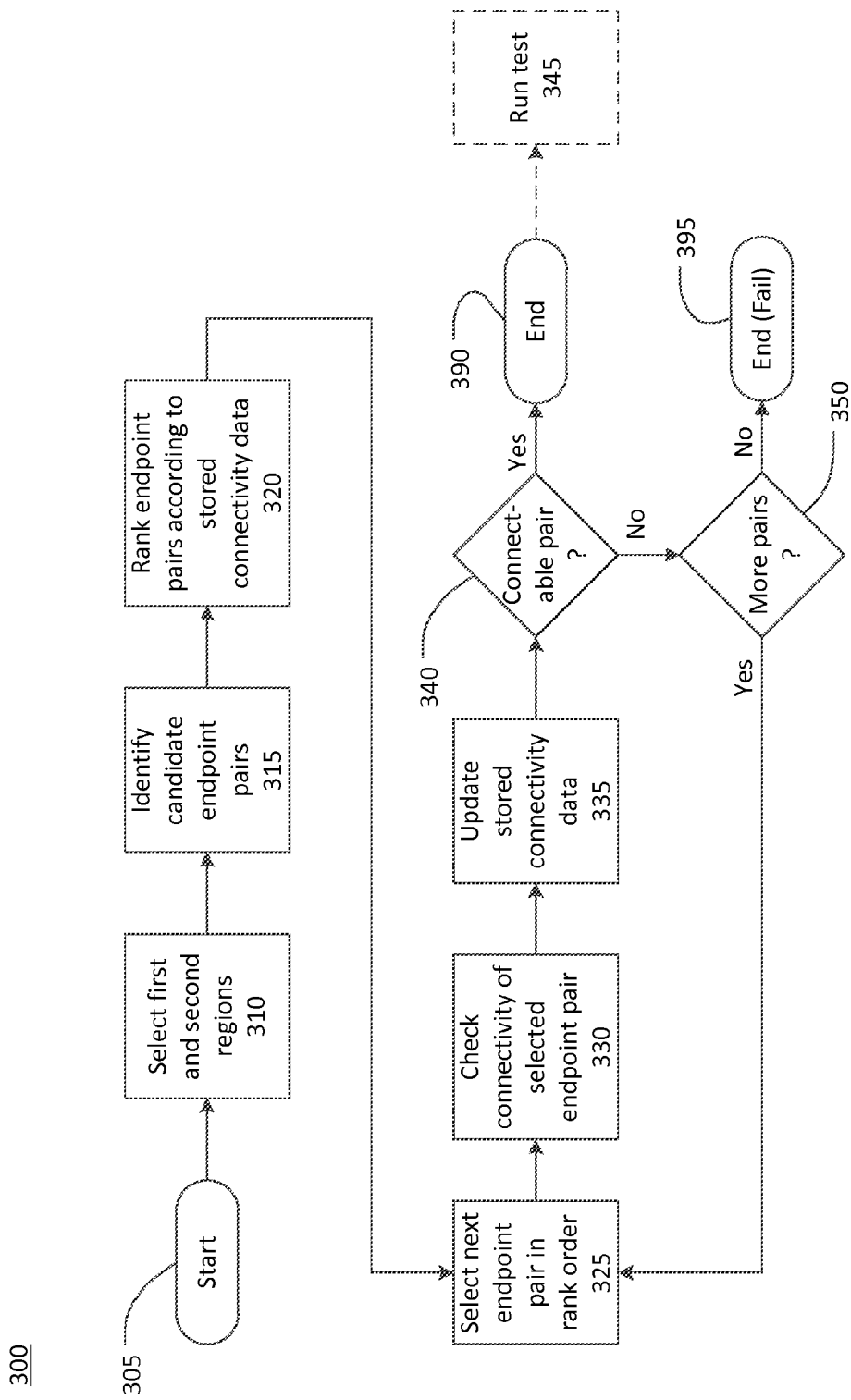
FIG. 3 is a flow chart of a process for selecting connectable end points.

FIG. 3 is a flow chart of a process for selecting pair of endpoints for conducting a network test. The process 300 may start at 305, and may end at either 390 if a suitable pair of endpoints has been located or at 395 if the process failed to locate a suitable pair of endpoints. When the process ends at 390 after the selection of a pair of endpoints, a network test may typically be run using the selected endpoints at 345. The process 300 may be performed in an environment as shown in FIG. 1 by a test administrator computing device such as the test administrator computing device 250.

The objective of the network test may be to determine the performance of the network between two selected regions of the network, such as the regions 120 and 130 in FIG. 1. The selected regions may be, for example, logically separate subnets or local area networks and/or physically separate location such as different cities, different buildings, or different floors of a common building. In some cases, such as conducting a test within a local area network, the selected regions may be coextensive. At 310, a first region and a second region within the network may be selected. Each of the first region and the second region may include a respective plurality of endpoints. The first and second regions may be selected, for example, by an operator using an operator interface to the test administrator computing device. The first and second regions may be selected automatically by the test administrator computing device.

At 315, candidate pairs may be identified. Each candidate endpoint pair may consist of an endpoint from the first region and an endpoint form the second region. Identifying candidate endpoint pairs may include identifying all endpoints in the first region and all endpoints in the second region. Each endpoint may be identified, for example, by an Internet protocol (IP) address. A list of all possible pairs of one endpoint from the first region and one endpoint from the second region may then be compiled, excluding any endpoints already in use for other network tests. Loopback pairs, in which the endpoints are the same physical device, may be eliminated. The remaining endpoint pairs are candidates for conducting the planned network test.

However, identifying a candidate endpoint pair does not guarantee that the two endpoints of the pair are in fact connectable. A pair of endpoints may not be connectable because one endpoint is off or off-line, because a network connection to an end point is disrupted, because an endpoint is reserved for a higher priority task, because the endpoints have incompatible capabilities, software, or hardware, or for other reasons. Thus a check to determine if a given endpoint pair is actually connectable may be appropriate prior to initiating a network test. However, the number of candidate endpoint pairs may be very large, such that a significant amount of time may be required to search through the candidate endpoint pairs to find a connectable endpoint pair. To reduce the amount of time required to locate a connectable endpoint pair, the search may be optimized based on prior knowledge.

At 320 the candidate endpoint pairs remaining from 315 may be ranked according to previously stored connectivity data. Each time the test administrator computing device initiates a network test, the test administrator computing device may check the connectivity of one or more endpoint pairs. The results of these connectivity checks may be stored, for example, in the form of a table of connectivity data. The table may list endpoint pairs that have been checked and an indication of whether each listed endpoint pair was determined to be connectable or not connectable. The fact that a particular endpoint pair was previously found to be connectable is not a guarantee that the endpoint pair is still connectable at the present time. However, it is reasonable to presume that a first endpoint pair previously found to be connectable is more likely to be connectable at the present time than a second endpoint pair previously found to be not connectable.

At 320, each of the candidate endpoint pairs may be assigned one of three ranks according to the stored connectivity data. A highest rank may be assigned to candidate endpoint pairs where the stored connectivity data indicates the pair was previously determined to be connectable. An intermediate rank may be assigned to candidate endpoint pairs where the connectivity has not yet been determined. A lowest rank may be assigned to candidate endpoint pairs where the stored connectivity data indicates the pair was previously determined to be not connectable.

At 325 a candidate endpoint pair may be selected in rank order, which is to say that endpoint pairs assigned the highest rank may be selected before endpoint pairs having the intermediate rank which are, in turn, selected before endpoint pairs having the lowest rank. At 330, the connectivity of the endpoint pair selected at 325 may be checked. Checking the connectivity of an endpoint pair may be done by instructing the endpoint pair to attempt to exchange messages and to report the result of the exchange. As a simple example, one or both of the endpoints of an endpoint pair may be instructed to initiate an ICMP (Internet Control Message Protocol) Echo transaction with the other endpoint (commonly called "pinging" the other endpoint). At 335, the result of the connectivity check performed at 330 may be used to update the stored connectivity data to reflect the current status (connectable/non-connectable) of the selected endpoint pair.

At 340, a determination may be made, based on the results of the connectivity check performed at 330, if the selected endpoint pair is connectable. If the endpoint pair is connectable, the process 300 may end at 390. Subsequently, the connectable endpoint pair may be instructed to perform the network test at 345.

When a determination is made at 340 that the selected endpoint pair is not connectable, a determination may be made at 350 if there are any additional candidate endpoint pairs. When there are no more candidate endpoint pairs, which is to say when all candidate endpoint pairs have been checked without locating a connectable endpoint pair, the process 300 may terminate at 395. When a determination is made at 350 that there are one or more additional endpoint pairs, the process 300 may return to 325 to select another endpoint pair. The actions from 325 to 350 may be performed cyclically until a connectable endpoint pair has been located or until the connectivity of all candidate endpoint pairs has been checked.

The actions taken to check the connectivity of an endpoint may include a test administrator computing device causing a message to be sent to a first endpoint of the endpoint pair instructing the first endpoint to conduct a connectivity check. The first endpoint may then send a message to the second endpoint of the endpoint pair. The second endpoint may then return a message to the first endpoint. The first endpoint, upon receiving the return message from the second endpoint or upon waiting a predetermined time interval without receiving the return message, may then send the results of the connectivity check to the test administrator computing device. These actions may occur over an extended time period, during which the test administrator computing device may initiate connectivity checks on other endpoint pairs. Thus connectivity check on multiple endpoint pairs may be performed concurrently, where "concurrently" means "within the same time period".

Figure 4:
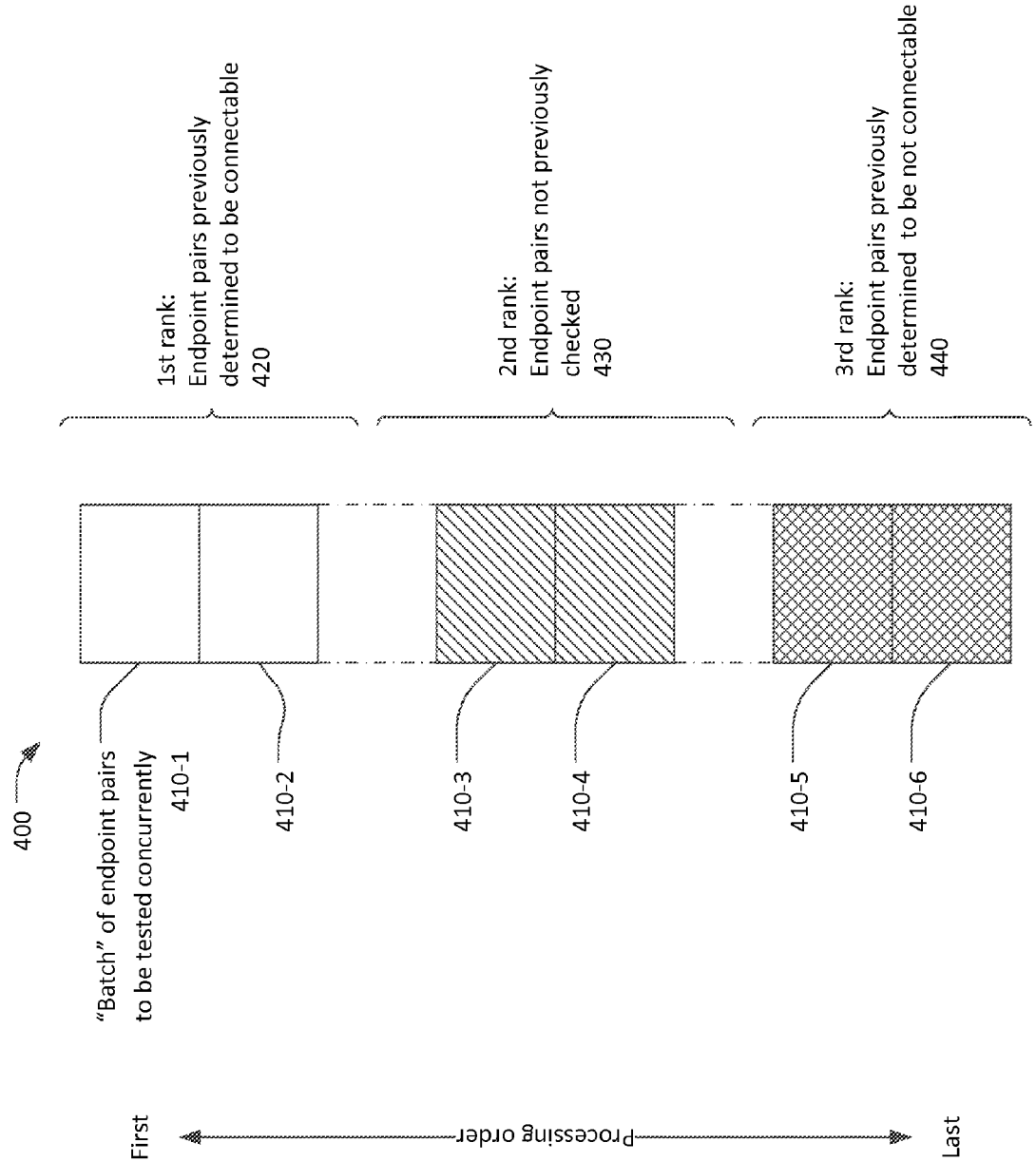
FIG. 4 is a graphical representation of prioritized end point pairs.

Referring now to FIG. 4, candidate endpoint pairs may be divided into batches 410-1 to 410-6, where a number of endpoint pairs in each batch is selected to allow concurrent connectivity checking of all of the endpoint pairs within a batch. The batches may be processed sequentially. The example of FIG. 4 shows a total of six batches 410-1 to 410-6. More or fewer than six batches may be required to check the connectivity of the candidate endpoints for a network test. The number of batches may depend on both the total number of candidate endpoints and the number of connectivity checks the test system can perform concurrently.

Batches may be filled with endpoint pairs in rank order. For example, batches that will be processed first (batches 410-1 and 410-2 in FIG. 4) may be filled with endpoint pairs that were assigned the highest rank, which is to say endpoint pairs previously determined to be connectable, as indicated by stored connectivity data. Batches that will be processed last (batches 410-5 and 410-6 in FIG. 4) may be filled with endpoint pairs that were assigned the lowest rank, which is to say endpoint pairs previously determined to be not connectable. Intermediate batches (batches 410-3 and 410-4 in FIG. 4) may be filled with endpoints pairs that have not yet been checked for connectivity.

Figure 5:
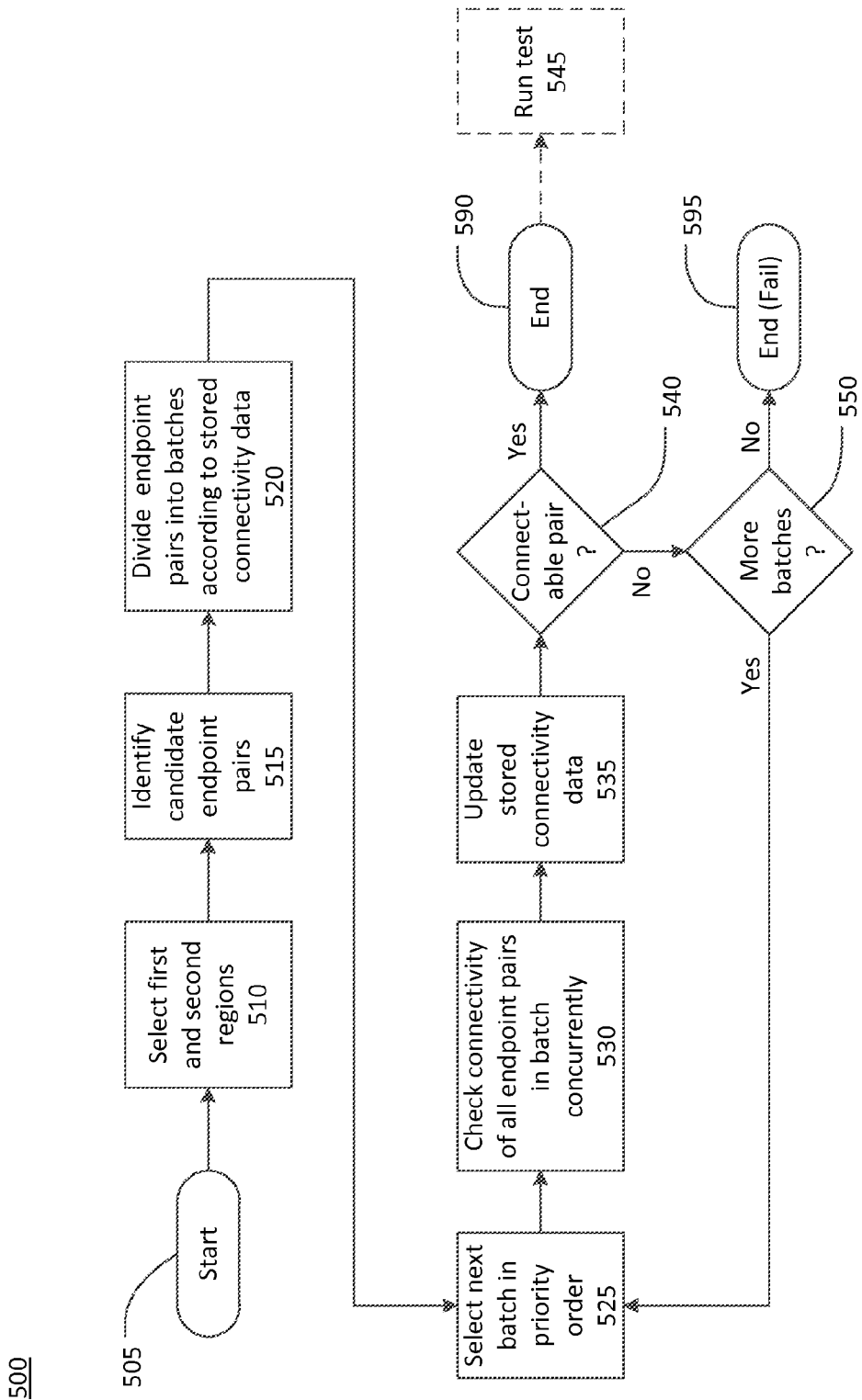
FIG. 5 is a flow chart of a process for selecting connectable end points.

FIG. 5 is a flow chart of a process for selecting pair of endpoints for conducting a network test. The process 500 may start at 505 and end at either 590 if a suitable pair of endpoints has been located or at 595 if the process failed to locate a suitable pair of endpoints. When the process ends at 590 after the selection of a pair of endpoints, a network test may typically be run using the selected endpoints at 545. The process 500 may be performed in an environment as shown in FIG. 1 by a test administrator computing device such as the test administrator computing device 250.

At 510, first and second regions of the network may be identified and, at 515, candidate endpoints pairs may be identified. These actions are essentially the same as the counterpart actions 310, 315 in the process 300, and the description of these actions will not be repeated.

At 520 the candidate endpoint pairs from 515 may be divided into two or more batches according to previously stored connectivity data. Each of the candidate endpoint pairs may be assigned one of three ranks according to the stored connectivity data. A highest rank may be assigned to candidate endpoint pairs where the stored connectivity data indicates the pair was previously determined to be connectable. An intermediate rank may be assigned to candidate endpoint pairs where the connectivity has not yet been determined. A lowest rank may be assigned to candidate endpoint pairs where the stored connectivity data indicates the pair was previously determined to be not connectable. The endpoint pairs may then be sorted according to their respective assigned ranks and divided into batches. The number of endpoint pairs in each batch may be selected to allow concurrent connectivity checking of all endpoints in a batch.

At 525 a batch may be selected in priority order using the following priority scheme: (1) batches containing only endpoints assigned the highest rank; (2) batches containing at least one endpoint assigned the highest rank; (3) batches containing only endpoints assigned the intermediate rank; (4) batches containing at least one endpoint assigned the intermediate rank; and (5) batches containing only endpoints assigned the lowest rank.

At 530, the connectivity of the all of the endpoint pairs in the batch selected at 525 may be checked concurrently. Checking the connectivity of each endpoint pairs may be done by instructing the endpoint pair to attempt to exchange messages and to report the result of the exchange. At 535, the result of the connectivity checks performed at 530 may be used to update the stored connectivity data to reflect the current status (connectable/non connectable) of the endpoint pairs within the selected batch.

At 540, a determination may be made, based on the results of the connectivity check performed at 530, if at least one connectable endpoint pair has be located. If a connectable endpoint pair has been located, the process 500 may end at

590. Subsequently, the connectable endpoint pair may be instructed to perform the network test at 545.

When a determination is made at 540 that a connectable endpoint pair has not been found, a determination may be made at 550 if there are any additional batches of candidate endpoint pairs. When there are no more batches, which is to say when all candidate endpoint pairs have been checked without locating a connectable endpoint pair, the process 500 may terminate at 595. When a determination is made at 550 that there are one or more additional batches of endpoint pairs, the process 500 may return to 525 to select another batch of candidate endpoint pairs. The actions from 525 to 550 may be performed cyclically until a connectable endpoint pair has been located or until the connectivity of all batches of candidate endpoint pairs has been checked.

Closing Comments

Throughout this description, the embodiments and examples shown should be considered as exemplars, rather than limitations on the apparatus and procedures disclosed or claimed. Although many of the examples presented herein involve specific combinations of method acts or system elements, it should be understood that those acts and those elements may be combined in other ways to accomplish the same objectives. With regard to flowcharts, additional and fewer steps may be taken, and the steps as shown may be combined or further refined to achieve the methods described herein. Acts, elements and features discussed only in connection with one embodiment are not intended to be excluded from a similar role in other embodiments.

As used herein, "plurality" means two or more. As used herein, a "set" of items may include one or more of such items. As used herein, whether in the written description or the claims, the terms "comprising", "including", "carrying", "having", "containing", "involving", and the like are to be understood to be open-ended, i.e., to mean including but not limited to. Only the transitional phrases "consisting of" and "consisting essentially of", respectively, are closed or semi-closed transitional phrases with respect to claims. Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements. As used herein, "and/or" means that the listed items are alternatives, but the alternatives also include any combination of the listed items.

It is claimed:

1. A method for conducting a test of a network including a plurality of endpoints, each endpoint including a software agent for conducting network tests, the method comprising:
   identifying, from the plurality of endpoints, candidate endpoints pairs to conduct the test;
   ranking the candidate endpoints pairs in accordance with stored connectivity data that indicates, for at least some of the candidate endpoint pairs, whether each candidate endpoint pair was previously determined to be connectable or not connectable, ranking the candidate endpoints further comprising:
      assigning a highest rank to candidate endpoint pairs previously determined to be connectable,
      assigning an intermediate rank to candidate endpoint pairs where the connectivity was not previously determined, and
      assigning a lowest rank to candidate endpoint pairs previously determined to be not connectable;
   checking the connectivity of the candidate endpoint pairs in rank order until a connectable endpoint pair is located; and
   instructing the connectable endpoint pair to conduct the test.

2. The method of claim 1, further comprising updating the stored connectivity data to reflect the results of the checking.

3. The method of claim 1, further comprising:
   dividing the ranked candidate endpoint pairs into two or more batches,
   wherein checking the connectivity of the candidate endpoint pairs comprises selecting the batches sequentially in rank order and checking the connectivity of the candidate endpoint pairs in each selected batch concurrently.

4. The method of claim 1, wherein identifying candidate endpoints pairs further comprises:
   receiving information identifying a first region of the network and a second region of the network, the first region containing a first plurality of endpoints and the second region containing a second plurality of endpoints; and
   identifying all possible endpoint pairs, each possible endpoint pair consisting of an end point from the first plurality of endpoints and an endpoint from the second plurality of endpoints.

5. The method of claim 4, wherein identifying candidate endpoints pairs further comprises:
   excluding any endpoints already involved in running a network test prior to identifying all possible endpoint pairs.

6. The method of claim 4, wherein identifying candidate endpoints pairs further comprises:
   eliminating any endpoints pairs where the two endpoints of the endpoint pair are located within the same physical device.

7. An apparatus for conducting a test of a network including a plurality of endpoints, each endpoint including a software agent for conducting network tests, the apparatus comprising:
   a storage medium storing instructions that, when executed, cause a computing device to perform actions comprising:
      identifying, from the plurality of endpoints, candidate endpoints pairs to conduct the test;
      ranking the candidate endpoints pairs in accordance with stored connectivity data that indicates, for at least some of the candidate endpoint pairs, whether each candidate endpoint pair was previously determined to be connectable or not connectable, ranking the candidate endpoints further comprising:
         assigning a highest rank to candidate endpoint pairs previously determined to be connectable,
         assigning an intermediate rank to candidate endpoint pairs where the connectivity was not previously determined,
         assigning a lowest rank to candidate endpoint pairs previously determined to be not connectable, and
      checking the connectivity of the candidate endpoint pairs in rank order until a connectable endpoint pair is located; and
      instructing the connectable endpoint pair to conduct the test.

8. The apparatus of claim 7, the actions performed further comprising updating the stored connectivity data to reflect the results of the checking.

9. The apparatus of claim 7, wherein ranking the candidate endpoints pairs in accordance with the stored connectivity data further comprises:
- dividing the ranked candidate endpoint pairs into two or more batches,
- wherein checking the connectivity of the candidate endpoint pairs comprises selecting the batches sequentially in rank order and checking the connectivity of the candidate endpoint pairs in each selected batch concurrently.

10. The apparatus of claim 7, wherein identifying candidate endpoints pairs further comprises:
- receiving information identifying a first region of the network and a second region of the network, the first region containing a first plurality of endpoints and the second region containing a second plurality of endpoints; and
- identifying all possible endpoint pairs, each possible endpoint pair consisting of an end point from the first plurality of endpoints and an endpoint from the second plurality of endpoints.

11. The apparatus of claim 10, wherein identifying candidate endpoints pairs further comprises:
- excluding any endpoints already involved in running a network test prior to identifying all possible endpoint pairs.

12. The apparatus of claim 10, wherein identifying candidate endpoints pairs further comprises:
- eliminating any endpoints pairs where the two endpoints of the endpoint pair are located within the same physical device.

13. The apparatus of claim 7, wherein the storage medium is incorporated in a storage device and the apparatus further comprises:
- a processor coupled to the storage device; and
- a memory coupled to the processor, a portion of the memory for storing the stored connectivity data.

\* \* \* \* \*